US 6,579,557 B1

(12) United States Patent
Benjamins et al.

(10) Patent No.: US 6,579,557 B1
(45) Date of Patent: Jun. 17, 2003

(54) FOOD PRODUCT COMPRISING GAS BUBBLES

(75) Inventors: Jan Benjamins, Vlaardingen (NL); Jacobus Van Eendenburg, Vlaardingen (NL); Eckhard Floeter, Vlaardingen (NL); Jan P Van Iersel, Delft (NL); Karel Abraham Kuypers, Schiedam (NL); Eddie G Pelan, Vlaardingen (NL)

(73) Assignee: Lipton, division of Conopco, Inc., Englewood Cliffs, NJ (US)

( * ) Notice: Subject to any disclaimer, the term of this patent is extended or adjusted under 35 U.S.C. 154(b) by 0 days.

(21) Appl. No.: 09/459,485

(22) Filed: Dec. 13, 1999

(30) Foreign Application Priority Data

Dec. 23, 1998 (EP) .............................. 98204442

(51) Int. Cl.⁷ ................................. A23D 7/00
(52) U.S. Cl. .................. 426/603; 426/601; 426/564
(58) Field of Search ................ 426/312, 564, 426/602, 565, 566–572; 516/6

(56) References Cited

U.S. PATENT DOCUMENTS 3,682,656 A * 8/1972 Wilton .................... 426/603
4,849,240 A * 7/1989 Giddey .................... 426/613
5,380,411 A * 1/1995 Schief .................. 204/157.15
5,472,726 A * 12/1995 Bee ........................ 426/565

FOREIGN PATENT DOCUMENTS

| EP | 0 285 198 A2 | 3/1988 |
| EP | 0 320 433 A2 | 6/1989 |
| EP | 0521543 | * 2/1992 |
| EP | 0 547 647 A1 | 11/1992 |
| FR | 2 067 293 | 8/1971 |
| GB | 2 134 117 A | 4/1983 |
| JP | 54-110210 | 8/1979 |
| JP | 08089196 | 9/1996 |
| SU | 1136831 | 8/1987 |
| WO | 88/00796 | 2/1988 |
| WO | 94/12063 | 6/1994 |

* cited by examiner

Primary Examiner—Carolyn Paden
(74) Attorney, Agent, or Firm—Gerard J. McGowan, Jr.

(57) ABSTRACT

The invention relates to food products comprising an aqueous phase and gas bubbles, whereby said gas bubbles are substantially dispersed in the aqueous phase, and whereby said gas bubbles have a mean diameter size distribution with a maximum below 10 μm and whereby said aqueous phase comprises a compound capable of forming at least a partial coating around said gas bubbles.

Food products are for example cheese, frying fats, dressings, margarines.

16 Claims, 4 Drawing Sheets

Figure 3  Upper part of water droplet

Figure 4  Lower part of water droplet

Figure 5

FOOD PRODUCT COMPRISING GAS BUBBLES

FIELD OF THE INVENTION

The invention relates to a food product comprising an aqueous phase and gas bubbles, and to a process for the preparation thereof. The invention especially relates to emulsions of an aqueous phase and a fatty phase, which emulsion additionally comprises gas bubbles.

BACKGROUND OF THE INVENTION

Food products in the form of emulsions are known. Examples are emulsions of a fatty phase and an aqueous phase, such as margarines (water in oil emulsions), fresh cheese (oil in water emulsion) and dressings (oil in water emulsion).

The physical stability of these products is quite important.

For example liquid or pourable emulsions may be relatively unstable in that water droplets which are part of the dispersed aqueous phase can sediment to the bottom of the emulsion. In the current application where reference is made to a "stable" system, avoiding the phenomenon of sedimentation of one phase is referred to. Sedimentation is seen in products comprising a fat phase and a dispersed aqueous phase, whereby water droplets sink to the bottom of the system, where a water droplet layer is formed. Simultaneously an oil layer may be formed on top of the product, although usually most oil will still be present in the emulsion layer. Under extreme circumstances sedimentation may lead to the formation of a separated aqueous phase and a separated oil phase.

The formation of an oil layer on top of an emulsion is referred to as oil exudation. Stable products show less than 20 vol % oil exudation, more preferred less than 10 vol % after storage for 4 weeks at a temperature of 5° C.

FR-A-7040472 discloses that the separation of a liquid margarine into two phases can also be at least partly overcome by incorporation of gas bubbles into said margarine. The size of the gas bubble is preferably between 1 and 25 $\mu$m, most preferred 2–10 $\mu$m. In this product gas is present in the oil phase.

WO 94/12063 discloses the use of gas cells in food products. Food products such as low fat spreads are disclosed, said products comprising gas cells and having a thermodynamic stability in excess of 2 weeks. More than 90% by number of the gas cells in said products have an average D3,2 particle size of less than 20 $\mu$m, most preferred 0.5 to 3 $\mu$m. The gas cells are prepared by application of high shear to the product or a pre mix.

It is furthermore known that the separation of a liquid margarine into two layers can be overcome at least partly by selection of a specific hardstock fat composition.

Although some of the above disclosed products show some improvement in stability against phase separation the above described methods and products often do not give satisfactory results.

Several problems are encountered if the prior art products are used.

Firstly the products disclosed in the cited documents do not show the required stability over time and the gas bubbles in these products are slowly dissolving over time in the product, instead of remaining in a dispersed state. Secondly the disclosed gas bubbles do not show the desired stability to survive processing conditions, especially when shear is applied at one or more stages.

Furthermore hardstock fat compositions that are used to improve stability of pourable water in oil emulsions such as liquid margarines, lead to products with increased viscosity. This increased viscosity can be undesirable for pourable products. Therefore avoiding the use of hardstock fat composition is desired.

Emulsions of water in oil, like margarine or other fat continuous emulsions are used as frying medium for the frying of food stuff.

It is known that during frying evaporation of the aqueous phase of fat and water containing products may cause severe spattering. Spattering of a water in oil emulsion is believed to be caused by the superheating of water droplets. At a certain point after heating said water droplets explosively evaporate, whereby oil can be spread all over the surroundings of a frying pan in which the emulsion is heated. This is not only unpleasant and needs cleaning, more significantly it may cause danger to the person who intends to fry foodstuff in the heated emulsion.

In the prior art, products are disclosed that show reduced spattering. For example additives like salt, emulsifiers or specific proteins can serve to reduce spattering.

Furthermore EP-A-285,198 discloses an edible plastified product comprising a continuous fat phase and a finely dispersed helium gas phase. The presence of a dispersed gas phase in these products is said to be beneficial for the spattering behavior of these products in frying, especially if the products comprise a dispersed phase.

Several products are linked to the use of the products according to EP-A-285,198. Firstly the gas bubbles in these products also slowly dissolved in the plastified food product and secondly they do not survive processing to a desired extent. Furthermore these products show the disadvantage that only helium can be applied as gas.

Furthermore JP-A-54110210 discloses a method to reduce spattering whereby a gaseous $CO_2$ generating substance is added to a phospholipid containing oil. Upon heating, said substance releases $CO_2$, whereby the spattering of oil can be reduced.

DEFINITION OF THE INVENTION

It has now been found that the above problems can all be solved by a food product comprising an aqueous phase comprising dispersed gas bubbles, wherein said gas bubbles are substantially dispersed in the aqueous phase, wherein said gas bubbles have a mean diameter size distribution with a maximum below 10 $\mu$m and wherein said aqueous phase comprises a compound capable of forming at least a partial coating around said gas bubbles.

Accordingly the present invention relates to a food product comprising an aqueous phase and gas bubbles, whereby said gas bubbles are substantially dispersed in the aqueous phase, and whereby said bubbles have a mean diameter size distribution with a maximum below 10 $\mu$m and in that said aqueous phase comprises a compound capable of forming at least a partial coating around said gas bubbles.

The invention also relates to a process for the preparation of these food products.

BRIEF DESCRIPTION OF THE DRAWINGS

FIG. 3A, 3B and 4 have been renumbered as FIGS. 3, 4 and 5 in order to avoid confusion during the printing process.

DETAILED DESCRIPTION

Where ranges are mentioned throughout the description and claims, the expression from a to b is meant to indicate from and including a, up to and including b, unless indicated otherwise.

In this application the terms "oil" and "fat" are used interchangeably.

The term gas bubbles refers to individual gas units which are all part of a dispersed gas phase.

Food products according to the invention comprise an aqueous phase, gas bubbles and at least one or more phases. A second phase can be formed for example by a fatty phase, a biopolymer phase or a phase comprising a gelling agent. Such food products are sometimes referred to as two-phase systems to indicate that at least an aqueous phase and at least one of these other phases is present. In this context the gas bubbles are not referred to as a separate phase.

Products with a biopolymer phase are for example disclosed in EP-A-547,647.

Preferably the aqueous phase and the second phase present are of different density.

Preferred food products comprise a fat phase and an aqueous phase.

Most preferred food products are emulsions of a fatty phase and an aqueous phase. Said emulsions are for example fat based spreads (oil or water continuous or bicontinuous), dressings, sauces, margarines, margarine like products.

In a preferred embodiment beverages are not included in the term "food product".

The aqueous phase of food products according to the invention comprises a compound capable of forming at least a partial coating around the gas bubbles.

Preferably the compound forms at least a partial coating around the gas bubbles.

Said coating can also be explained as a partial shell which forms a border between the contents of the gas bubble and its surroundings.

This coating is believed to give a beneficial contribution to the stability of the gas bubbles; i.e. it partly prevents dissolving of the gas bubbles into the product, coalescence of the gas bubbles and diffusion of the gas bubbles out of the product.

Said coating can be made visible by CSLM techniques wherein for example a protein coating can be made visible by protein specific colouring with a fluorescent label. In general the shell of of for example protein or another compound being capable of formation of at least a partial coating around said gas bubbles, is so condensed and comprises such high concentration of the coloured compound, that shells are easily distinguishable.

Said compounds should in general be capable of formation a boundary layer stabilising the compositions i.e. they can serve to reduce Oswald ripening, to reduce gas leakage and to reduce coalescence of gas bubbles.

For the purpose of the invention, coalescence is defined as the flowing together of two or more gas bubbles under the formation of one gas bubble with increased diameter.

According to a preferred embodiment said compound is a protein being capable of formation of at least one disulphide bridge per molecule.

Preferably said protein is capable of formation of at least 5 disulphide bridges per molecule, preferably at least 8, more preferred at least 12, even more preferred at least 15, most preferred 17 to 30 disulphide bridges.

Preferably protein present in the coating around the gas bubbles in food products according to the invention, comprises sulphur bridges, more preferred said protein comprises the maximum amount of sulphur bridges possible for the respective protein.

Said disulphide bridges can for example be formed via cysteine-cysteine couplings in said protein. Therefore said protein preferably comprises from 2 to 80 cysteine molecules per protein, more preferred from 10 to 50, most preferred from 20 to 40 cysteine molecules per protein.

It has been found that for desired effects, in particular regarding the stability of the gas bubbles, said compound preferably has a molecular weight of from 10,000 to 400,000 g/mol, preferably 10,000 to 80,000 g/mol, more preferably from 50,000 to 80,000 g/mol. A too small compound may not be able to form a sufficiently strong shell around the gas bubbles, whereas a too large compound may not remain in solution.

According to a preferred embodiment said compound is a protein having a molecular weight of from 50,000 to 80,000 g/mol and being capable of formation of from 15 to 25 disulphide bridges per molecular.

Examples of compounds include albumin and/or soyaglycinin or combinations thereof. Soya glycinin comprises 48 cysteine per mol; the molecular weight is about 320,000 g/mol.

The most preferred compound is serum albumin, preferably from bovine origin.

Said compound is preferably present in an amount such that it is sufficient to provide stabilisation for the gas bubbles. On the other hand the upper limit of concentration is restricted by solubility of the said compound in water. Moreover the compound concentration is preferably such that, the residue formation is as desired upon use of the food product in frying . If residue formation comparable to margarine is desired, the compound concentration is preferably from 0.2 to 30 wt % , more preferably from 2 to 10 wt %, on aqueous phase.

Gas bubbles comprised in products according to the invention, should be substantially dispersed in the aqueous phase of said food products. This means that preferably at least 50 vol %, more preferably at least 70 vol %, even more preferably at least 80 vol %, most preferred 90–100 vol % of all gas bubbles are dispersed in the aqueous phase, whereas the remaining part of the gas bubbles may be in another phase of the food product, for example in a fatty phase. Random distribution of gas bubbles in for example margarine is known from EP-A-285,198. It has been found that such products on the one hand still show spattering upon use as a frying agent and on the other hand often show instability upon storage.

Without wishing to be bound by any theory, it is believed that the presence of gas bubbles in the aqueous phase influences the average density of the aqueous phase.

For example in pourable water in oil emulsions such as liquid margarines, which comprise a dispersed aqueous phase, incorporation of gas bubbles in said aqueous phase is believed to enable adjustment of the density of the dispersed aqueous phase. Said adjustment determines physical characteristics of a pourable two phase system. If gas bubbles are present in the dispersed aqueous phase of a water in oil emulsion, they can decrease the density of said water droplets.

This leads to reduced sedimentation of the dispersed aqueous phase.

The advantageous effects in reduced spattering and increased storage stability can only be obtained if the gas is dispersed in the form of small bubbles, having a mean diameter size distribution with a maximum below 10 $\mu$m, preferably below 5 $\mu$m, more preferably below 3 $\mu$m, even more preferably below 2 $\mu$m, most preferred below 1 $\mu$m. A method to determine the mean diameter size distribution of said gas bubbles is illustrated in the examples.

In a preferred embodiment, at least 80 vol % of the total volume of gas in food products according to the invention, is present as gas bubbles having a mean diameter size between 0.5 and 15 $\mu$m.

Preferred food products according to the invention comprise a dispersed aqueous phase. The water droplets forming the dispersed aqueous phase in these preferred products are preferably of a diameter of from 5 to about 40 $\mu$m. The water droplets can comprise one or more gas bubbles per droplet, depending on the relative size of the water droplet, compared to the size of the gas bubbles. If small gas bubbles are present, for example with a diameter of from 0.1 to 3 $\mu$m, more suitably 0.1 to 0.4 $\mu$m, more than one gas bubble can be present in a water droplet.

In the current invention it has been found that for frying purposes, a water in oil emulsion with many gas bubbles of relatively small size is preferred over a smaller amount of relatively bigger water droplets. Each water droplet may serve as a nucleating site for evaporating water droplets and therefore the more sites the better.

For the purpose of reducing spattering in a spreadable water in oil emulsion it was found that the most suitable amount of gas bubbles per water droplet is between 10 and 70, more preferred from 10 to 30.

It will be appreciated that the amount of gas bubbles that can be present in a water droplet also depends on both the size of the gas bubbles and the size of the water droplet.

If food products according to the invention are pourable two phase systems, for which phase separation should be prevented, the preferred mean diameter size of gas bubbles is below 10 $\mu$m, more preferred from 0.1 to 5 $\mu$m, most preferred from 0.5 to 5 $\mu$m.

It will be appreciated that in the preferred products, which comprise a dispersed aqueous phase, the diameter of the gas bubbles is limited by the diameter of the water droplets in which said gas bubbles are present.

If it is desired to reduce spattering upon frying use, food products according to the invention preferably comprise gas bubbles having a mean diameter size of less than 5 $\mu$m, preferably less than 3 $\mu$m, most preferred from 0.1 to 1 $\mu$m.

The volume of gas in water droplets making up the aqueous phase is believed to determine the density of the aqueous phase. If the gas volume per water droplet is such that the density of the water droplet is below the density of oil, the water droplets will even rise to the system's surface. This is also called creaming of the dispersed aqueous phase. It is believed to be within the capabilities of the skilled person to select the desired volume of gas per water droplet, while guided by the teaching as given herein.

If products according to the invention are heated for frying, it is believed that water droplets comprising gas bubbles, in such an amount that the density of said droplets preferably at most equals the density of the other phase, slowly float to the product's surface. Without wishing to be bound by any theory, it is believed that the gas bubbles in the aqueous phase can also serve as nucleation sites, thereby preventing overheating of water droplets.

The total amount of gas present in the food product according to the invention was found to depend on the use that is envisaged. The amount of gas is preferably such that the density of the aqueous phase about equals the density of the second phase. An amount of gas in the aqueous phase of for example from 0.1 to 20 vol % on aqueous phase was found to lead to satisfying results.

It is believed that it is within the capabilities of the skilled person to select the appropriate amount of gas. The vol % of gas on aqueous phase can be determined by CSLM as described in the examples, or by measuring the density of an isolated aqueous phase, and comparing the measured density to the density of water free of incorporated gas bubbles.

Preferably the aqueous phase of the products comprises from 0.1 to 15 vol %, more preferably from 0.5 to 10 vol %, more preferred from 1 to 4 vol % of gas on aqueous phase.

In case the main purpose of addition of the coated gas bubbles is increasing the stability of a pourable product like a water in oil emulsion, the preferred amount of gas on aqueous phase is preferably from 10 to 20 wt %.

The gas bubbles in the claimed products can comprise any gas, for example selected from the group consisting of inert gas such as nitrogen, helium, argon and the like; oxygen, and air. It has been found that in case increased stability of gas bubbles is desired, the gas in said bubbles preferably comprises some oxygen.

Highly preferred gasses are nitrogen, argon, oxygen, air and/or combinations thereof.

Food products according to the invention are storage stable.

For liquid or pourable products this stability can be measured by a test wherein the food product is stored at about 5° C. for a time of 1 week to 6 months. After a certain storage period the product is checked on the formation of an oil or water layer on top of it.

Preferred products show after 4 weeks of storage at 5° C. an oil layer of less than 10 vol %, more preferred less than 3 vol %, most preferred less than 1 vol % on total product volume.

The stability of the gas bubbles in the products according to the invention is preferably such that the total amount of gas bubbles after storage at ambient temperature for a period of from 4 to 6 weeks is from 50 to 100% of the amount present directly after preparation, preferably from 80 to 100%, whereby the amount of gas bubbles directly after preparation of said products is set to 100%.

Food products according to the invention preferably show reduced spattering upon use in frying. Spattering can be measured by determining the spattering value according to a method illustrated in the examples. The definition of spattering is presented in the examples. Preferably food products according to the invention show a primary spattering value (spattering upon heating of a frying product such as margarine, without incorporation of a food product to be fried) of from 8 to 10, preferably from 9 to 10. The secondary spattering value (spattering upon incorporation of food product such as a snack in a hot frying product) for products according to the invention is preferably from 5–10.

Food products according to the invention are for example fat based spreadable products, margarine (like) products, dairy spreads, cheese, dressings, liquid margarine. These products preferably comprise from 0.1 to 95 wt % fat on total product.

A liquid margarine is a pourable water in oil emulsion comprising generally from 1 to 40, preferably 5 to 30 wt % water on total product weight.

The current invention is especially suitable for pourable water in oil emulsions comprising from 1 to 40 wt % aqueous phase on total product.

Edible foams like protein foams are not intended to be included in the products according to the invention and neither are products wherein the gas bubbles are essentially surrounded by fat crystals, as may be the case in cream like products like whipped cream, after they have been subjected to a whipping treatment.

The optional fat phase can comprise any triglyceride oil. A fat phase preferably is rich in triglycerides comprising (poly) unsaturated fatty acid residues is highly preferred. Therefore the fat is preferably selected from the group comprising sunflower oil, soybean oil, rapeseed oil, cottonseed oil, olive oil, corn oil, groundnut oil, or low melting butterfat fractions and/or combinations thereof. These fats may be partially hydrogenated.

According to another embodiment the optional fat phase comprises sucrose polyesters.

Optionally the product comprises in addition to these fats a hard fat component selected from the group comprising: hardened rapeseed oil, hardened soybean oil, hardened rapeseed oil, hardened cottonseed oil, hardened corn oil, hardened, groundnut oil, palm oil, hardenedpalm oil, palm oil fractions, hardened palm oil fractions, butterfat or butterfat fractions. These fats are optionally partly or fully hydrogenated to obtain the desired structuring properties.

This hard fat may partly serve to impart structure and or stability to the products, in addition to the stability obtained by the aqueous phase comprising gas bubbles. In view of the potential disadvantages of the presence of hard fat in for example pourable products, like increased viscosity and reduced pourability, it is preferred that the amount of hard fat is below 2 wt %, more preferred below 1 wt %. Most preferred hard fat is essentially absent in products according to the invention if they are pourable.

In addition to the above mentioned ingredients, food products according to the invention may optionally contain further ingredients suitable for use in these products. Examples of these materials are sugar or other sweetener materials, EDTA, spices, salt, bulking agents, egg yolk, emulsifiers, stabilising agents, flavouring materials, colouring materials, acids, preserving agents, vegetable particles etc.

Other suitable ingredients that can be included in food products according to the invention are spattering reducing agents such as lecithin and salt or combinations thereof.

Optionally the products according to the invention comprise gas which is not in the form of (partially) coated gas bubbles. These gas bubbles which are not coated can be present in addition to the coated gas bubbles according to the invention. They may for example originate from a protein foam and may have a different diameter size distribution, i.e. for example with a maximum above 10 micrometer. In view of the above it will be appreciated that these uncoated gas bubbles show reduced stability against shear and other processing conditions.

Generally the balance of compositions according to the invention will be water.

Products according to the invention can be prepared by general methods as known to the person skilled in the art. For example margarines and frying fats can be prepared by using a standard votator process.

Cheese can be prepared by for example a standard soft cheese or fresh cheese production process.

However part of the food product is preferably prepared according to the method as outlined below.

According to a preferred embodiment, an aqueous phase comprising gas bubbles is prepared in a separate step and thereafter mixed with other ingredients such as a fat phase or a biopolymer phase.

Therefore in a further aspect the invention relates to a method for the preparation of a food product as described above, said method comprising the steps of
  a) preparing a mixture comprising a compound capable of formation of at least a partial coating around gas bubbles, and water
  b) subjecting said mixture to a sonication treatment
  c) mixing said sonicated mixture with the remaining ingredients.

According to a preferred embodiment, the mixture in step (a) is prepared under stirring until a homogeneous mixture is formed. Homogeneous in this context is meant to indicate that said compound is present in the aqueous phase and essentially no residue is present on the bottom of a jar in which the mixture is prepared if stirring is stopped.

Applicants believe that during this preparation a dispersion or solution of protein in an aqueous phase is prepared, whereby said aqueous phase comprises dissolved or dispersed gas due to said stirring.

In step (a) also other ingredients that are part of the aqueous phase of the final product can be added. Such ingredients are for example water soluble flavours, colourants, stabilisers, gelling agents and the like.

Optionally after step (a), excess compound that has not solubilized but forms a residue is removed by centrifugation or diafiltration.

According to step (b) sonication is applied. This step can be carried out by immersing a sonicator tip into the mixture or by putting said mixture in a sonicating bath.

For the indicated method of sonication, any sonicator type can be used. Preferably the type of sonicator and the dimension of the sonicator tip are chosen such that they are in accordance with the volume of the mixture that is subjected to sonication.

The sonication treatment can be carried out in the pulsed mode or in the continuous mode, whereby the pulsed mode is preferred.

Preferably sonication is carried out under conditions comparable to those of the sonication method as used in the examples. According this method the sonicator is of the Branson model 450, with a 0.5 inch probe. A beaker of 150 $cm^3$ is half-filled with the indicated mixture. The power level during sonication is 8 and the duty cycle in pulsed mode is preferably 30%.

It has been found that gas is easily dispersed in the sonicated mixture if sonication is applied under stirring. Stirring is preferably moderate or vigorous, whereby for example 200 to 10.000 rpm is applied for a volume of about 50–500 ml.

Preferably stirring is such that a foam is formed on the surface of the sonicated mixture.

Sonication is preferably carried out under an atmosphere of a gas with a specific composition whereby said gas composition comprises preferably some oxygen. Also for example nitrogen or argon can be present. Also air is a suitable composition for the process of the current invention. A suitable atmosphere is for example formed by a combination of oxygen and nitrogen in a volume ratio of oxygen/nitrogen of from 1/20 to 1/5.

The process of the current invention can be carried out under the above described atmosphere.

According to a further embodiment the mixture is sparged with a suitable gas or mixture of gases as indicated above. Sparging can be carried out at any time during the preparation of the food product according to the invention.

Said sparging can be carried out before sonicating said aqueous mixture to saturate the mixture with said gas composition (in step (a)) or during sonication (in step (b)). A combination of these methods is also possible.

Sonication can be carried out under standard pressure. It is also possible to work under reduced or increased pressure. However care should be taken that the sonication conditions are chosen such that the gas bubbles that are formed in the product according to the invention do not collapse due to overpressure and do not burst due to under-pressure.

In a preferred process, if a certain pressure is applied during preparation of the aqueous phase, said pressure is remained throughout additional process steps.

Preferably in step (b) a pressure of from 0.5 to 4 bar, preferably from 0.8 to 2.5 bar, most preferred from 1 to 2 bar is applied. Said pressure can be created using any of the gas compositions as indicated above.

Sonication can be carried out at any given temperature. However it will be appreciated that the presence of heat sensitive compounds should be taken into account when choosing the desired temperature. Preferably sonication is carried out around temperatures below the denaturation temperature of proteins if there are any proteins present; this to overcome denaturation and subsequent precipitation of said proteins. Preferably in step (b) said mixture is at a temperature of from 30–90° C., preferably from 35–70° C.

Especially suitable temperatures of sonication are from 65 to 72° C. for soy glycinin and from 50 to 74° C. for bovine serum albumin.

Sonication can be carried out at any pH. The pH applied among others seems to depend on the desired pH of the end product. It has been found that in view of the potential presence of protein during sonication, the pH during sonication is preferably above the iso-electric pH of said protein, more preferably above 5, even more preferred from 6 to 9, most preferred from 6 to 7.

Said pH can be adjusted to the desired value in step a, after the compound capable of formation of at least a partial coating, other aqueous phase ingredients have been mixed.

Preferably the amount of gas bubbles in the starting material after sonication is such that the aqueous phase comprises from 1 exp07 to 2 exp10 gas bubbles per $cm^3$.

The gas bubble mean diameter size distribution in the sonicated material is preferably in accordance with the distribution desired for the final product.

Therefore an average diameter of about 2 to 5 $\mu$m is desired for a sonicated emulsion which will be applied in a frying product that shows reduced spattering. More increased average size distribution is possible if the material is applied in a pourable product.

After step a and step b, a sonicated aqueous phase comprising gas bubbles results.

Said aqueous phase is preferably cooled to a temperature below 10° C., more preferred from 0 to 5° C., before further processing is started.

This aqueous phase can be used as such but it can also be combined with further ingredients of the aqueous phase followed by combination with other ingredients, for example a fatty phase and/or any of the other ingredients that are suitable ingredients for food products according to the invention, such as those indicated above.

Said aqueous phase can be dispersed into a fatty phase to form a water in oil emulsion. Dispersion of a fatty phase into the formed aqueous phase is also possible.

Dispersion of a phase comprising gelling agent or a biopolymer phase into the formed aqueous phase is also possible.

The amount of gas required in the aqueous phase is preferably so much that some additional gas is present compared to the final product, to compensate for loss of part of the gas bubbles during further processing.

Further processing of the resulting mixture of fatty phase and aqueous phase is possible. It has been found that the gas bubbles that are dispersed in the aqueous phase are resistant to considerable shear. Said aqueous phase is preferably prepared such that it can withstand homogenisation pressures of up to 4 bar.

According to yet another embodiment after step (b), wherein sonicated aqueous phase comprising gas bubbles is formed, said aqueous phase can be treated by centrifugation. Said centrifugation treatment is optionally preceded by a resting treatment. During such a resting treatment the aqueous phase is preferably stored at a temperature of from 0 to 15° C., whereby the larger gas bubbles are allowed to float to the surface of the system. Said larger bubbles can be removed by decantation. The resulting aqueous phase, which comprises relatively small gas bubbles is then centrifuged at low velocity for example around 800 rpm. In such a centrifuging treatment gas bubbles are concentrated in the upper part of the system and water comprising an increased amount of gas bubbles can easily be decanted. Herewith an aqueous phase with an increased content of relatively small gas bubbles can be obtained.

Moreover by this treatment compound such as protein that does not participate in the gas bubble coating can be separated off.

The obtained aqueous phase can for example be used to prepare a pumpable oleaginous composition (i.e. a liquid margarine).

A preferred process to prepare a pumpable oleaginous composition comprises the steps of melting triglyceride oil in shear mixer such as an A unit, cooling to below the alpha crystallisation temperature and subsequent, or prior to cooling, mixing the triglyceride oil with the above indicated aqueous phase. The resulting product is preferably stored at a temperature from 0 to 15° C.

According to another embodiment the obtained aqueous phase is used for the preparation of a margarine or margarine like product comprising from 30 to 95 wt % fat. A preferred process to prepare such a margarine (like) product comprises the steps of emulsification of aqueous phase in a melted fatty phase, mixing the formed emulsion to ensure uniformity, cooling said emulsion in a shear unit, for example a tubular swept surface heat exchanger, to obtain crystallisation, working the resulting partially crystallised emulsion in for example a pin stirrer unit and packaging the resulting fat continuous product. Optionally before packaging the emulsion is subjected to a resting treatment to increase the final product consistency. Said resting is for example carried out in a resting unit or a quiescent tube. Optionally the aqueous phase is pasteurised before mixing it with a fatty phase.

According to yet another embodiment, said aqueous phase comprising gas bubbles is further processed to form a product comprising an aqueous phase and a biopolymer phase. Such products are for example disclosed in EP-A-547647. A preferred process to prepare such products comprises the steps of preparing a gel phase comprising aqueous phase with gas bubbles, edible surfactant, for example monoglycerides; optionally co-surfactant, salt, preservatives, flavouring agents, colouring agents; and preparing furthermore a biopolymer phase comprising water, biopolymer such as starch or gelatine and optionally other ingredients for example flavouring agents, colouring agents, preservatives.

The gel phase is heated above the Kraft Temperature of the components and subsequently cooled to from 20–70° C. The resulting gel phase is mixed with biopolymer phase to form the final products. Said products can be of spreadable consistency but can also be pourable or squeezable.

Products according to the invention can be used for any purpose, especially for frying of foodstuff.

The invention is now illustrated by the following non-limiting examples.

EXAMPLES

The average mean diameter of gas bubbles is determined by measuring D(3,2) values by light scattering using a Malvern apparatus and following the procedure as described in the manual thereof.

Determination of Spattering Value in a Spattering Test

The spattering behaviour of food products according to the invention was evaluated after storage of the products for 1 or 8 days at 5° C.

Primary spattering (SV1) was assessed under standardised conditions in which an aliquot of a food product was;heated in a glass dish and the amount of fat spattered onto a sheet of paper held above the dish was assessed after the water content of the food product had been driven off by heating.

Secondary spattering (SV2) was assessed under standardised conditions in which the amount of fat spattered onto a sheet of paper held above the dish is assessed after injection of a quantity of 10 ml water into the dish.

In assessment of both primary and secondary spattering value about 25 g food product was heated in a glass dish on an electric plate to about 205° C. The fat that spattered out of the pan by force of expanding evaporating water droplets was caught on a sheet of paper situated above the pan. The image obtained was compared with a set of standard pictures number 0–10 whereby the number of the best resembling picture was recorded as the spattering value. 10 indicates no spattering and zero indicates very bad spattering. The general indication is as follows.

| Score | Comments |
|---|---|
| 10 | excellent |
| 8 | good |
| 6 | passable |
| 4 | unsatisfactory for SV1, almost passable for SV2 |
| 2 | very poor |

Typical results for household margarines (80 wt % fat) are 8.5 for primary spattering (SV1) and 4.6 for secondary spattering (SV2) under the conditions of the above mentioned test.

Microscopic Method

Description of the procedure to visualise gas bubbles in the water phase of a water in oil emulsion.

The microscope that has been used to visualise the gas bubbles in the water phase is a confocal scanning light microscope (CSLM). This instrument is commercially available from a variety of manufactures. The basic principle of CSLM is that in a bulk specimen a stack of in focus slices can be obtained resulting in a 3-D image data set. The microscopy mode is based on visualisation of flourescently labeled features.

To visualise the gas bubbles a fluorescent dye is brought in contact with the emulsion. The dye diffuses into the emulsion and based on the high affinity of the dye for proteins it is almost exclusively present at the proteins after some time allowing the observation of the protein in the emulsion using CSLM. Since the gas bubbles are surrounded by a protein layer these gas bubbles show up in the water droplets as spherical features in which a black hole, being the gas, can be discerned. For the included pictures, the spatial resolution of the light microscope is limited to approximately 0.5 $\mu$m. This means that the black hole is not visible in gas bubbles that are smaller than approximately 1 $\mu$m.

Procedure for Visualisation

Approximately 1 g of the emulsion was mixed or shaken gently with 1 drop of the fluorescent dye Rhodamin (0.1% w/v in water), until the Rhodamin solution was completely dispersed in the emulsion. Rhodamin diffuses both through the oil phase and the water phase and is accumulated at proteins and particulate material like emulsifiers. The fluorescent dye was also present at low concentration in the aqueous phase which resulted in a weak fluorescent signal from the aqueous phase. This allowed localisation and identification of the water droplets in the emulsion.

Part of the stained emulsion was placed in a suitable bulk sample holder which allows observation of an undisturbed not-squeezed part of the emulsion. Using the confocal microscope a stack of optical slices were collected. Typical instrumental conditions are optical sections separated 0.5 $\mu$m in z-direction using a high magnifying objective lens (for instance 63 times, 1.3 N.A. oil immersion).

According to another microscopic method the gas bubble amount and size was determined as follows.

The alternative method (example 8) for determining the number of gas bubbles in the water phase is as follows:

The gas bubble solution is put in a microscopic counting chamber; layer thickness 10 $\mu$m.

The microscope is a Zeiss Axioplan 2 using phase contrast. Using this phase contrast option the gas bubbles become visible as bright spots. The magnification is 40×1.6×0.63 (objective is 40×). The image is recorded with Sony video camera.

The monitor picture is captured with video capture software using a capture card in a PC. with Image Pro Plus (image analysis software) this captured image is analyzed. The number of gas bubbles is determined using the count/size option of the measurement tool of the software.

Example 1

1: According to the Invention

Preparation of Gas Bubbles in an Aqueous Phase

An aqueous emulsion was prepared comprising 5 wt % bovine serum albumin Mw: 69.000, 35 cystein per molecule and 17 sulphur bridges per molecule. Said mixture was transferred to a beaker (150 cm³ volume) in an amount of 75 cm³, and was stirred at 1000 rpm.

Said mixture was brought to a temperature of 50° C. and subsequently subjected to sonication using a Branson model 450 sonicator, set to a power level of 8 and a duty cycle of 30%, with 0.5 inch probe which was immersed into said mixture, just outside the stirrer's swirl.

Sonication was carried out in the pulsed mode for 5 minutes. Sonication was carried out under normal air atmosphere. The pH of the mixture was 6.2. D3,2 measurements on the sonicated aqueous phase reveled that the gas bubbles in the aqueous phase had a mean diameter size distribution with a maximum below 10 μm.

Subsequently a washing treatment was carried out to remove part of the protein that did not participate in the formation of shell around the gas bubbles and to increase the concentration of gas bubbles per ml of solution. The bigger bubbles were separated by creaming during 1 night. The part comprising the bigger bubbles (I) were separated from the fraction comprising smaller bubbles. The liquid fraction containing the smaller bubbles was centrifuged (800 rpm, 60 min) and the layer of liquid which comprised almost no gas bubbles was removed to result in a fraction enriched in smaller gas bubbles (II). Both the bigger bubble fraction (I) and the fraction (II) were combined and fresh water was added to reach the original amount. In this way the amount of BSA is reduced from 5 wt % to about 0.5 wt %.

Preparation of a food product comprising gas bubbles in the aqueous phase.

After sonication the resulting mixture of the above process was cooled to 5° C. and mixed with a fatty phase. A fatty phase was prepared as follows.

Crystals of a triglyceride oil, having a melting point of 70° C. were first formed in a separate stream. The crystals were formed by cooling a 10% rape oil solution in sunflower oil in an A-unit (wall temperature was −10° C.). Before emulsification this concentrated crystal suspension was diluted as needed (e.g. to 2 wt % in a standard Liquid margarine). The oil phase that was used for dilution already contained the oil soluble emulsifiers (Bolec, Dimodan). The resulting crystal suspension was dispersed in this oil phase by stirring (15 min, 600 rpm).

The water phase comprising gas bubbles was added to the oil phase while stirring. After water phase addition stirring was continued for 10 minutes at 1000 rpm.

Comparative Example 1A

The procedure of example 1 was repeated with the exception that instead of washed gas bubble solution, demi water was added. This example is not according to the invention.

The product composition and results are shown in table 1.

TABLE 1 product composition and results of the spattering test for example 1/1A

| Code | Example 1 | Example 1A |
|---|---|---|
| Product composition (wt %) | | |
| Sunflower oil | 78.8 | 77.3 |
| Dimodan ™ LS (Danisco) | 0.5 | 0.5 |

TABLE 1-continued product composition and results of the spattering test for example 1/1A

| Code | Example 1 | Example 1A |
|---|---|---|
| Bolec ™ ZT (Quest) | 0.2 | 0.2 |
| Fully hardened rapeseed | 0.5 | 2 |
| gas bubbles in water, washed | 20 | |
| Demi-water | | 20 |
| Results | | |
| SV1, 1 day | 9 | 1 |
| SV1, 8 days | 7 | ND |

ND: not determined

The average size of all bubbles was verified by microscopic techniques. The microscopic technique used was the CSLM.

The average mean diameter was below 10 μm.

Microscopic studies with CSLM microscopy and protein staining furthermore confirmed that in example 1, the BSA protein formed a coating (shell) around the gas bubbles.

It is concluded that the incorporation of at least partially coated gas bubbles in the aqueous phase of pourable margarine like products results in improved primary spattering behaviour.

Example 2

The procedure of example 1 was followed except that the aqueous phase comprising gas bubbles was not washed.

Comparative Example 2A

The procedure of example 2 was followed except that a 5 wt % BSA containing aqueous phase was used that had not been submitted to sonication and hence no gas bubbles were formed.

It is concluded that Bovine Serum Albumine (BSA) has an influence on the primary spattering value.

It is demonstrated that, compared to products comprising only BSA and no gas bubbles, the primary spattering is even further reduced by the presence of coated gas bubbles in the aqueous phase.

TABLE 2 product composition and results of the spattering test for example 2/2A

| Code | Example 2 | Comparative example 2A |
|---|---|---|
| Product composition (wt %) | | |
| Sunflower oil | 79.4 | 77.5 |
| Dimodan ™ LS (Danisco) | 0.1 | 0.5 |
| Bolec ™ ZT (Quest) | | |
| Fully hardened rapeseed oil | 0.5 | 2 |

TABLE 2-continued product composition and results of the spattering test for example 2/2A

| Code | Example 2 | Comparative example 2A |
|---|---|---|
| gas bubbles in water, unwashed | 20 | |
| 5 wt % BSA solution | | 20 |
| Results | | |
| SV1, 1 day | 9 | 5 |
| SV1, 8 days | 7 | ND |

ND: not determined

Example 3

The procedure of example 1 was followed except that the emulsifiers Bolec™ and Dimodan™ were left out and the aqueous phase comprising gas bubbles was not washed before use.

TABLE 3 product composition and results of the spattering test for example 3

| Code | Example 3 |
|---|---|
| Product composition (wt %) | |
| Sunflower oil | 78 |
| Dimodan ™ LS (Danisco) | — |
| Bolec ™ ZT (Quest) | — |
| Fully hardened rape seed oil | 2 |
| gas bubbles in water, unwashed | 20 |
| BSA solution | — |
| Results | |
| SV1, 1 day | 8 |
| SV2, 1 day | 5 |

The gas bubbles were made visible by CSLM microscopy. The majority of gas bubbles was clearly present in the dispersed aqueous phase. Said gas bubbles had a mean diameter size distribution of less than 10 μm. By protein staining, a coating of protein was made visible around said gas bubbles. The food products according to example 3 showed a storage stability of at least one month at 5° C. The coated gas bubbles were stable during processing.

It is concluded that despite the absence of Bolec which is known to improve spattering behaviour, the obtained products show satisfying spattering values for primary and secondary spattering.

Example 4

Spreadable margarine like food products were prepared by a conventional process wherein a premix of ingredients was prepared from a fat phase and an aqueous phase at elevated temperature. Emulsifier components were introduced into the molten fat phase. The premix was cooled to below 25° C. and worked in a series of scraped surface heat exchangers and pin stirrers to obtain a fat continuous plastified product.

The fat phase composition is shown in table 4. The fat blend used comprised a liquid oil and fully hydrogenated palm oil and fully hydrogenated palm oil and palmkernel oil. The solid fat content (SFC) of this fat phase at different temperatures is given below:

| 10° C. | 35% SFC |
|---|---|
| 20° C. | 19% SFC |
| 30° C. | 8% SFC |
| 35° C. | 4.5% SFC |

The aqueous phase was prepared as either a gas bubble containing solution as described in example 1 or was demi-water for comparative example 4A. Potassium sorbate was added to the aqueous phase as a preservative. The pH of the aqueous phase was 6.9.

TABLE 4 composition and results of spattering test for example 4/4A

| Code | Example 4 | Comparative Example 4A |
|---|---|---|
| Product composition (wt %) | | |
| fat blend | 79.25 | 79.25 |
| Hymono 4404 (Danisco) | 0.5 | 0.5 |
| Bolec ZT (Quest) | 0.1 | 0.1 |
| beta carotene (0.4%) | 0.15 | 0.15 |
| gas bubbles in water, unwashed | 20 | |
| demi water | | 20 |
| Results | | |
| SV1, 1 day | 7 | 0 |
| SV2, 1 day | 5.5 | ND |

ND: not determined

It is concluded that the incorporation of gas bubbles in the aqueous phase of a solid frying product results in highly improved spattering behaviour, both for primary and for secondary spattering.

Example 5 and 6

A pourable liquid margarine comprising 10 wt % water on total product was prepared according to the process of example 1 except that the washing treatment was left out. In example 5, 2.5 vol % gas(air) was present on total aqueous phase. In example 6, 6 vol % gas (air) was present on total aqueous phase.

In comparative example 5A a water phase, essentially free of gas was added to the oil phase of examples 5 and 6. The product composition and results are in table 5.

TABLE 5 composition and results of stability test of examples 5, 6, 5A

| Code | Example 5 | Example 6 | Comparative Example 5A |
|---|---|---|---|
| Product composition (wt %) | | | |
| Sunflower oil | 88 | 88 | 88 |
| Admul Wol | 1 | 1 | 1 |
| Fully hardened rapeseed | 1 | 1 | 1 |
| gas bubbles in water, plus BSA, washed, centrifuged at 1000 rpm, ambient temp. | 10 | 10 | |
| Demi-water | | | 10 |
| Results | | | |
| Oil exudation after 4 weeks storage at 5° C. C. (1) | 10% | 6% | 13% |

(1): oil exudation was measured as oil layer thickness on total product thickness in a cylinder. The ratio is expressed as a percentage oil exudation.

The products according to example 6 did not show sedimentation of water droplets while the products according to example 5 showed some sedimentation after storage for 2.5 months.

The results of this example clearly show that an increased amount of gas on aqueous phase may reduce oil exudation and thus increase stability of a pourable water in oil emulsion.

The coated gas bubbles showed the desired stability during processing.

Example 7

The following product was prepared according to the method of example 1.
Composition:
SF-oil: 77.95%
BolecZT: 0.05%
Fully hardened rapeseed oil: 2%
gasbubbles in water: 20%

Figure 1:
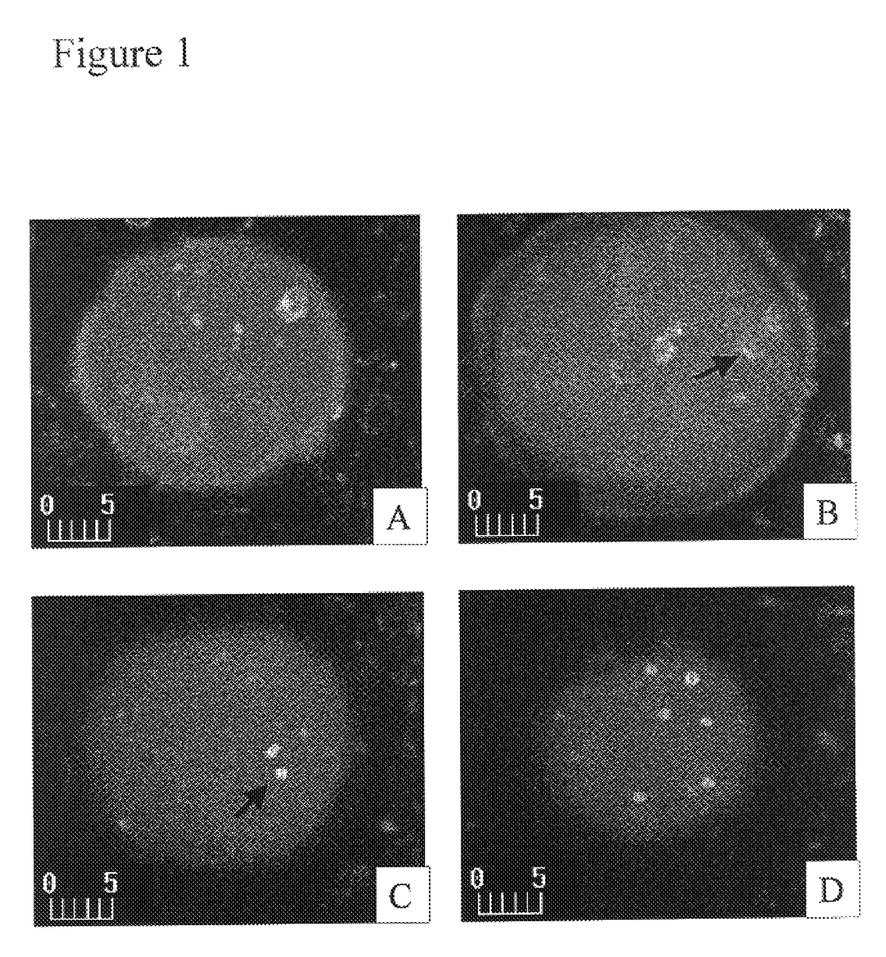
FIG. 1 shows a confocal image of the aqueous phase comprising gas bubbles prepared by sonication.
Figure 2:
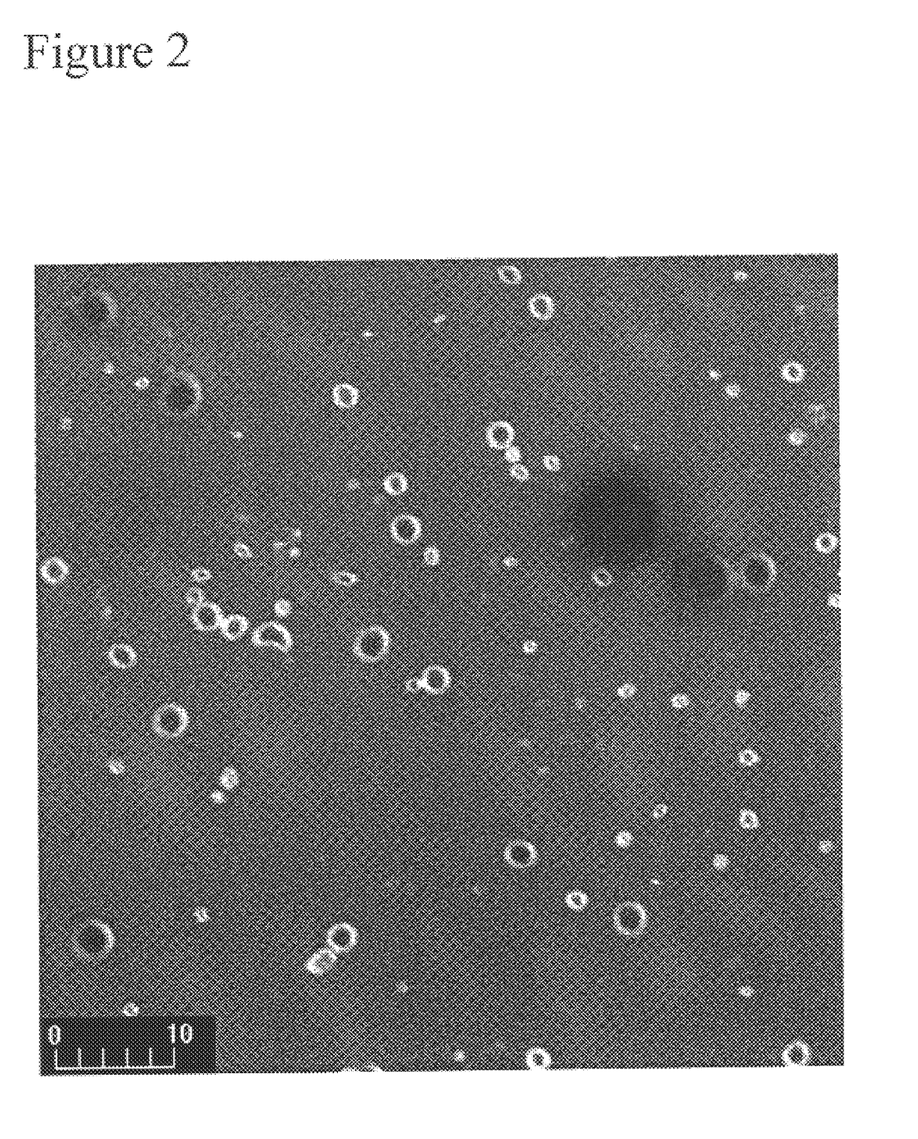
FIG. 2 shows confocal optical sections of a water droplet (25 $\mu$m diameter) in a product according to example 1.

CSLM pictures were made and are included in FIGS. 1–2.

FIG. 1 shows a confocal image of the aqueous phase comprising gas bubbles prepared by sonication. The size of the gas bubbles ranges from about 10 $\mu$m to about 0.5 $\mu$m in diameter.

FIG. 2 shows confocal optical sections of a water droplet (25 $\mu$m diameter) in a product according to example 1.

Protein in the gas bubbles was not exclusively present as interfaces surrounding gas bubbles. Irregular shaped protein particles were found to be present in the aqueous phase originating from 'leaky' gas bubbles or protein not taken up in a gas bubble interface during preparation of the gas bubbles. Gas bubbles were present mainly in the upper region of the water droplets due to the upward pressure (Buoyancy) of features with low density in a liquid medium of high density. The gas bubbles were not fixed to the water/oil interface but were moving around inside the water droplet due to Brownian motion.

In the sub figures of FIG. 2, several different slices are shown. In FIG. 2A the lower part of a water droplet is shown at 4 $\mu$m from the bottom of the water droplet, in FIG. 2B a slice at 10 $\mu$m from the bottom is shown, in FIG. 2C the upper part, 10 $\mu$m from the top of the water droplet and in FIG. 2D at 7 $\mu$m from the top.

Arrows are used to indicate the gas bubbles in FIG. 2C, 2D. Protein is arrowed in FIGS. 2A, 2B. It is clear from these pictures that protein particles are found in the lower part of the water droplet, while the majority of gas bubbles is found in the upper part of the water droplet. This is in line with the expectations which are based on the low density of gas bubbles compared to the density of water.

The gas volume can be calculated as follows:

Volume of a water droplet with diameter of 20 $\mu$m is about 4200 $\mu$m$^3$.

Volume of gas in a water droplet with diameter of about 1 $\mu$m is about 0,5 $\mu$m$^3$. It is assumed that the average diameter of the gas bubbles is about 1 $\mu$m.

The total volume of 137 counted gas bubbles is thus about 72 $\mu$m$^3$.

Gas volume was thus about 1,7% on aqueous phase.

Example 8

A pourable margarine product was prepared with the method described in example 1 and the product composition of example 7.

Spattering experiments were carried out and a comparison was made between a product without gas bubbles and one with coated gas bubbles.

In the concentration range from zero up to 8×10$^9$/ml the SV1 increases from 6.3 to 8.8 and SV2 from 3 to 7.

The Liquid Margarine emulsion was put in a microscopic counting chamber; layer thickness 10 $\mu$m. Conventional light microscopy was used.

The microscope was a Zeiss Axioplan 2 using bright field illumination. The magnification was 100×1.6×0.63 (oil immersion objective is 100×).

The number of gasbubbles was about 25–40% of the number that was initially present in the water phase before emulsification.

Figure 3:
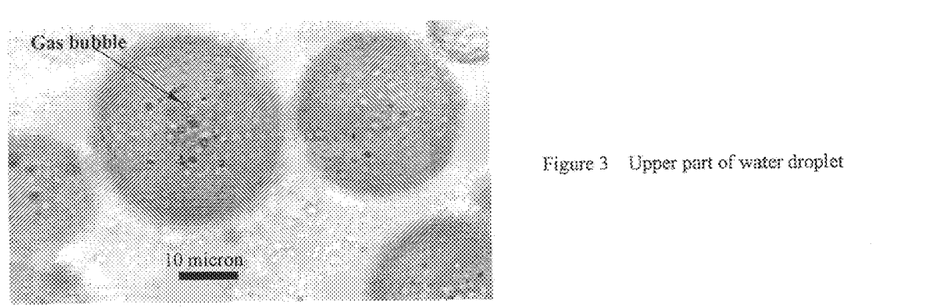
FIG. 3 shows the upper part of a water droplet.

FIG. 3 shows the upper part (3A) and the lower part (3B) of a water droplet.

The gas bubbles are easily identified and are essentially present in the upper part of the water droplet.

Figure 4:
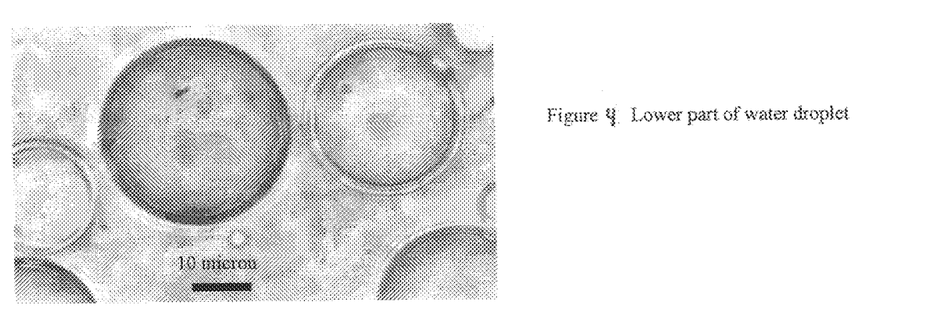
FIG. 4 show the lower part of a water droplet.
Figure 5:
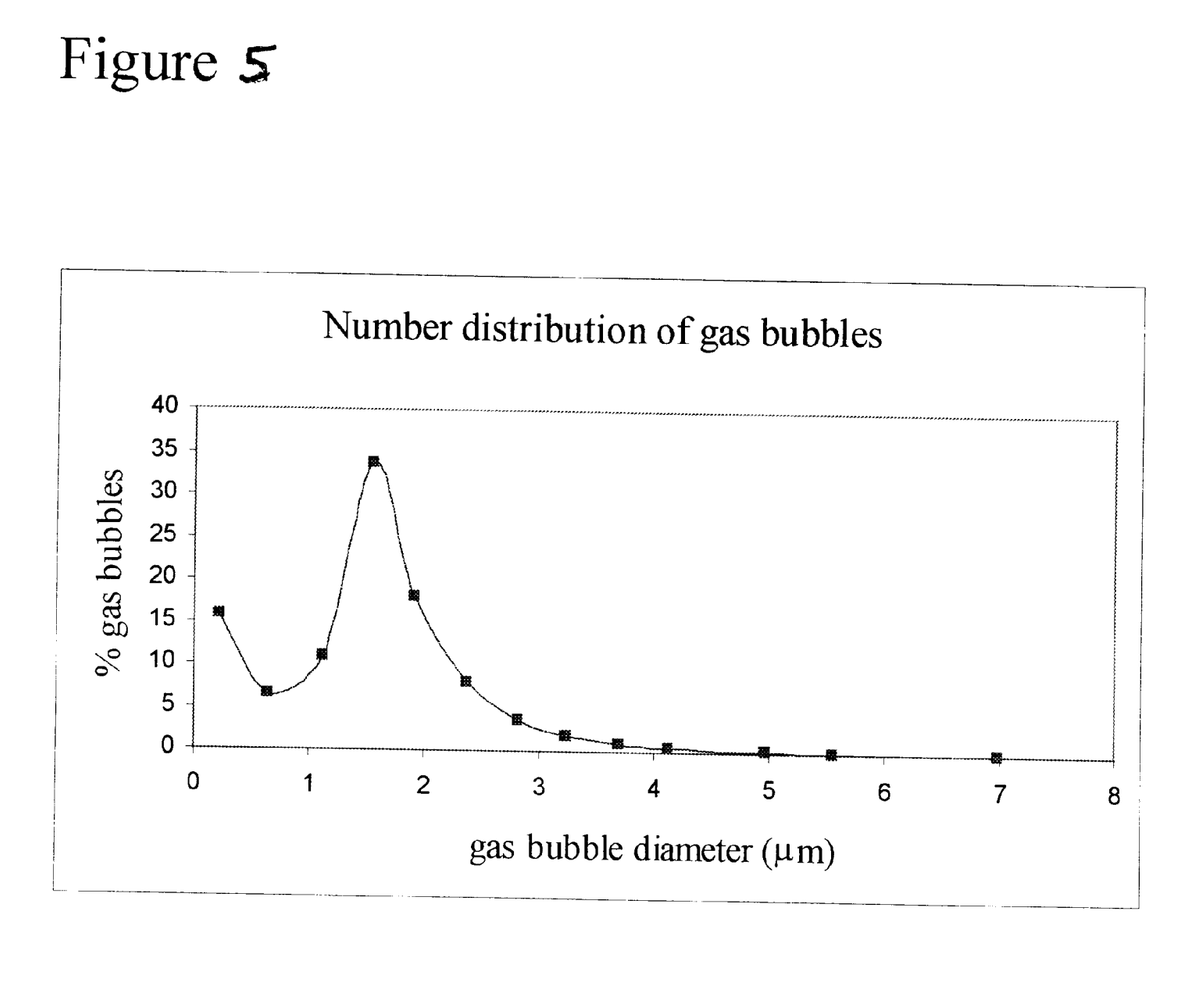
FIG. 5 shows the number distribution of a gas bubbles in the aqueous phase before mixing with the fatty phase, as determined by image analysis.

FIG. 4 shows the number distribution of a gas bubbles in the aqueous phase before mixing with the fatty phase, as determined by image analysis.

FIG. 4 demonstrates that the average size distribution is between 1 and 2 $\mu$m.

What is claimed is:

1. Food product which is an emulsion comprising an aqueous phase and a fatty phase comprising a dispersed aqueous phase and gas bubbles, characterized in that said gas bubbles are substantially dispersed in the aqueous phase, and in that said gas bubbles have a mean diameter size distribution with a maximum below 10 $\mu$m and in that said aqueous phase comprises a compound capable of forming at least a partial coating around said gas bubbles.

2. Food product according to claim 1, wherein the compound forms at least a partial coating around said gas bubbles.

3. Food product according to claim 1, characterized in that said compound has a molecular weight of from 10.000 to 400.000 g/mol.

4. Food product according to claim 1, characterized in that said compound is present in an amount of from 0.2 to 30 wt. % on aqueous phase.

5. Food product according to claim 1, characterized in that said product has a stability against oil exudation of at least 4 weeks.

6. Food product according to claim 1, characterized in that the aqueous phase of said product comprises from 0.1 to 20 vol. % of gas on aqueous phase.

7. Food product according to claim 1, showing upon use in frying a second food a primary spattering value of from 8 to 10.

8. Process of using the product according to claim 1, comprising frying of foodstuff in said product.

9. Food product comprising an aqueous phase and gas bubbles, characterized in that said gas bubbles are substantially dispersed in the aqueous phase, and in that said gas bubbles have a mean diameter size distribution with a maximum below 10 $\mu$m and in that said aqueous phase comprises a compound capable of forming at least a partial coating around said gas bubbles wherein said compound is a protein capable of formation of at least one disulphide bridge.

10. Food product according to claim 9, characterized in that said protein is capable of formation of at least 5 disulphide bridges per molecule.

11. Food product according to claim 9, characterized in that said protein has a molecular weight of from 50.000 to 80.000 g/mol and is capable of formation of from 15 to 25 disulphide bridges per molecule.

12. Food product according to claim 9, characterized in that said protein is bovine serum albumin.

13. Method for the preparation of a food product comprising a dispersed aqueous phase and gas bubbles, wherein said gas bubbles are substantially dispersed in the aqueous phase, and said gas bubbles have a mean diameter size distribution with a maximum below 10 $\mu$m and wherein said aqueous phase comprises an ingredient comprising a compound capable of forming at least a partial coating around said gas bubbles, comprising the steps of:

(a) preparing a mixture comprising said compound and water (b) subjecting said mixture to a sonication treatment (c) mixing said sonicated mixture with further ingredients.

14. Method according to claim 13, characterized in that in step (b) sonication is applied under stirring.

15. Method according to claim 13, characterized in that in step (b) said mixture is at a temperature of from 30 to 90° C.

16. Method to enhance the stability of a liquid margarine comprising an aqueous phase and a fatty phase whereby gas bubbles are incorporated substantially in a dispersed aqueous phase of said liquid margarine.

* * * * *